(12) United States Patent
Berke et al.

(10) Patent No.: US 9,915,984 B2
(45) Date of Patent: Mar. 13, 2018

(54) INFORMATION HANDLING SYSTEM HEAT SINK COMPATIBILITY MANAGEMENT

(71) Applicant: Dell Products L.P., Round Rock, TX (US)

(72) Inventors: Stuart Allen Berke, Austin, TX (US); Dinesh Kunnathur Ragupathi, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 542 days.

(21) Appl. No.: 14/483,421

(22) Filed: Sep. 11, 2014

(65) Prior Publication Data

US 2016/0081231 A1 Mar. 17, 2016

(51) Int. Cl.
- *H05K 7/20* (2006.01)
- *G05B 15/02* (2006.01)
- *G06F 1/20* (2006.01)
- *G06F 9/50* (2006.01)

(52) U.S. Cl.
CPC ............... *G06F 1/20* (2013.01); *G06F 1/206* (2013.01); *G06F 9/5094* (2013.01)

(58) Field of Classification Search
CPC ............. G06F 1/20; G06F 1/203; G06F 1/206
See application file for complete search history.

(56) References Cited

U.S. PATENT DOCUMENTS

| | | |
|---|---|---|
| 5,168,921 A | 12/1992 | Meyer, IV |
| 6,122,166 A | 9/2000 | Mochizuki et al. |
| 6,288,371 B1 * | 9/2001 | Hamilton ............ G01R 31/2849 165/185 |
| 7,411,791 B2 | 8/2008 | Cheng et al. |
| 7,856,341 B2 * | 12/2010 | Carlson ..................... G01K 1/14 165/104.11 |
| 7,954,007 B2 * | 5/2011 | McMillan ............... G06F 1/206 714/31 |
| 8,449,173 B1 * | 5/2013 | Strong ..................... G06F 11/24 324/500 |
| 8,686,749 B2 * | 4/2014 | Erwin ................ G01R 31/2884 324/762.01 |
| 2006/0023423 A1 | 2/2006 | Kuo et al. |
| 2007/0097620 A1 * | 5/2007 | Leech ....................... G06F 1/20 361/679.54 |

(Continued)

OTHER PUBLICATIONS

Hasnain Shabbir et al., U.S. Appl. No. 14/445,419, filed Jul. 29, 2014, entitled Systems and Methods for Parallel Feedback Temperature Control.

*Primary Examiner* — Charles Kasenge
(74) *Attorney, Agent, or Firm* — Terrile, Cannatti, Chambers & Holland, LLP; Robert W. Holland (57) ABSTRACT

A thermal response engine on an information handling system compares a processor thermal response to a predetermined workload with an expected thermal response to the predetermined workload in order to validate that a heat sink disposed on the processor matches a heat sink used by a thermal controller profile to manage thermal conditions of the information handling system. If the heat sink thermal characteristics fail to match up with expected thermal characteristics, the thermal response engine provides the thermal controller with an appropriate thermal profile and alerts the end user of an incompatibility.

16 Claims, 7 Drawing Sheets

(56) References Cited

U.S. PATENT DOCUMENTS

2008/0154536 A1* 6/2008 McMillan ............... G06F 1/206
  702/132
2009/0210190 A1* 8/2009 Carlson ................... G01K 1/14
  702/130
2010/0034235 A1* 2/2010 Chen ...................... G01N 25/18
  374/44

* cited by examiner

INFORMATION HANDLING SYSTEM HEAT SINK COMPATIBILITY MANAGEMENT

BACKGROUND OF THE INVENTION

Field of the Invention

The present invention relates in general to the field of information handling system management, and more particularly to information handling system heat sink compatibility management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One difficulty that often arises with information handling system design is that excess thermal energy released during consumption of power to run electronic components tends to cause temperature increases that can damage the information handling system. In general, the central processing unit or units (CPUs) disposed within a housing create the most thermal energy, however, other components also add thermal energy, such as memory, graphics processing units (GPU's), communications cards, power supplies and even passive components disposed in a motherboard to maintain power within desired constraints. Generally, information handling systems include passive and/or active thermal management devices that help to dissipate excess thermal energy from within to outside of the housing. An example of a passive thermal energy transfer device is a heat sink placed on a CPU to draw heat away from the CPU. Active thermal management typically involves a cooling fan that blows cooling airflow through an information handling system housing and past heated components to transfer thermal energy outside of the housing. Typically, the speed of the cooling fan is managed based upon temperature sensor readings within the information handling system housing and integrated in some of the components. For example, CPUs sometimes integrate a number of temperature sensors that monitor thermal conditions at different locations within a CPU and provide sensed temperature readings to a fan controller, which applies sensed thermal conditions to set a cooling fan speed. Generally, cooling fan speeds are set to maintain predetermined thermal constraints without excessive airflow speeds so that acoustics from cooling fan operations and power consumption are kept to a minimum. If available cooling fan airflow speeds are insufficient to maintain thermal constraints, information handling systems typically reduce power consumption of components, such as by throttling CPU operations, and thus reduce thermal energy creation so that available cooling fan airflow will maintain thermal constraints.

Difficulties with management of thermal energy tend to arise most often when powerful processing components are disposed in smaller housings. Generally, more powerful processing components have greater power consumption and thus dissipate greater amounts of heat when consuming power. In contrast, smaller housings have reduced room for air with less air mass and restricted airflow paths so that greater airflow speeds from cooling fans with more torque are typically needed to accomplish the thermal transfer relative to larger housings. In particular, dense server information handling system platforms, such as 2 CPU socket or 4 CPU socket half-height blade servers, 1U, and 2U servers, often cannot simultaneously support maximum capacity, maximum performance and maximum features. Instead, configuration restrictions are typically used at manufacture to limit simultaneous population of unsupportable CPUs, memory modules (DIMMs), storage drives, I/O adapters, etc. . . . , so that supportable configurations include appropriate design and cost tradeoffs. One example of such a tradeoff is the physical volume and air-path width of CPU heat sinks versus CPU power consumption. Due to height constraints in dense server information handling system chassis, heat sinks grow horizontally relative to a CPU footprint in order to have adequate mass to support sufficient thermal conduction from high-power CPUs to allow full performance without thermal throttling. Although larger heat sinks allow higher power CPUs, the increased heat sink width extends over other component sockets or components, such as DIMM slots, so that fewer such components may be included. In one example embodiment, a server information handling system can include 24 DIMMs with 80 W CPUs, 20 DIMMs with 95-120 W CPUs, and 16 DIMMs with 130 W CPUs. In another embodiment, heat sink shapes are further adapted to accommodate components, such a GPU, by including a slot cut from the heat sink where the GPU resides.

Although tradeoffs between processing capabilities and thermal constraints are supported by different types of heat sinks, difficulties sometimes arise if a server information handling system is configured with an incorrect heat sink. If a high-power CPU has a small heat sink, then the CPU's capabilities will likely be underutilized as thermal throttling prevents the CPU from achieving full power. If a low power CPU has as large heat sink, then component sockets will be blocked from usage. For example, the large heat sink might block DIMM slots without adding any additional processing performance since a smaller heat sink could allow the CPU to operate at full speed. Heat sink characteristics may vary in confusing ways based upon other factors, such as the expected operating environment (fresh air versus conditioned cooling airflow), or variations in active cooling, such as different fan sizes and the use of liquid cooling. In some instances, closed loop logic that controls active cooling, such as a cooling fan controller, may become unstable or act abnormally with inefficient operations due to unexpected thermal responses with respect to characterized behaviors. End users often have difficulty in addressing such problems since heat sinks are generally passive thermal control devices that end users typically do not interact with.

SUMMARY OF THE INVENTION

Therefore a need has arisen for a system and method which manages heat sink compatibility with varying information handling system configurations.

In accordance with the present invention, a system and method are provided which substantially reduce the disadvantages and problems associated with previous methods and systems with thermal management at an information handling system. Heat sink automated identification provides validation of a thermal profile used for thermal management where an identified heat sink matches heat sink configuration information. A corrected thermal profile for thermal management of an information handling system may be applied if the identified heat sink fails to match the configuration information stored on the information handling system.

More specifically, a thermal response engine stored in non-volatile memory of an information handling system management subsystem, such as the BIOS or BMC, identifies one or more heat sinks coupled to one or more processing components disposed in the information handling system, such as CPUs. The thermal response engine validates an identified heat sink as matching a configured heat sink if the thermal response of the heat sink to a characterized workload matches an expected thermal response, such as a temperature increase from an idle state to a second state reached after running a known instruction set for a predetermined time. If the heat sink thermal response fails to match an expected thermal response, then the thermal response engine may issue an alert and alter the thermal management of the information handling system to an appropriate thermal profile for the detected heat sink. In one alternative embodiment, identification information is included on the heat sink to aid in automated reading of the actual heat sink coupled to each CPU in the information handling system.

The present invention provides a number of important technical advantages. One example of an important technical advantage is that an information handling system thermal incompatibility between configured components and heat sink configuration is automatically identified and addressed. An incompatible heat sink configuration is automatically characterized by the information handling system and thermal controls are adjusted to adapt to the detected heat sink. As a result, information handling systems continue to operate in a best available mode of operation until an end user is able to address the heat sink incompatibility. Advantageously, automated detection and correction of heat sink incompatibility issues helps to prevent end users from having to debug a difficult problem that otherwise tends to require visual inspection by a qualified technician to correct.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Heat sink compatibility with an information handling system processing and memory configuration is managed and validated by monitoring the heat sink thermal response under a characterized workload. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
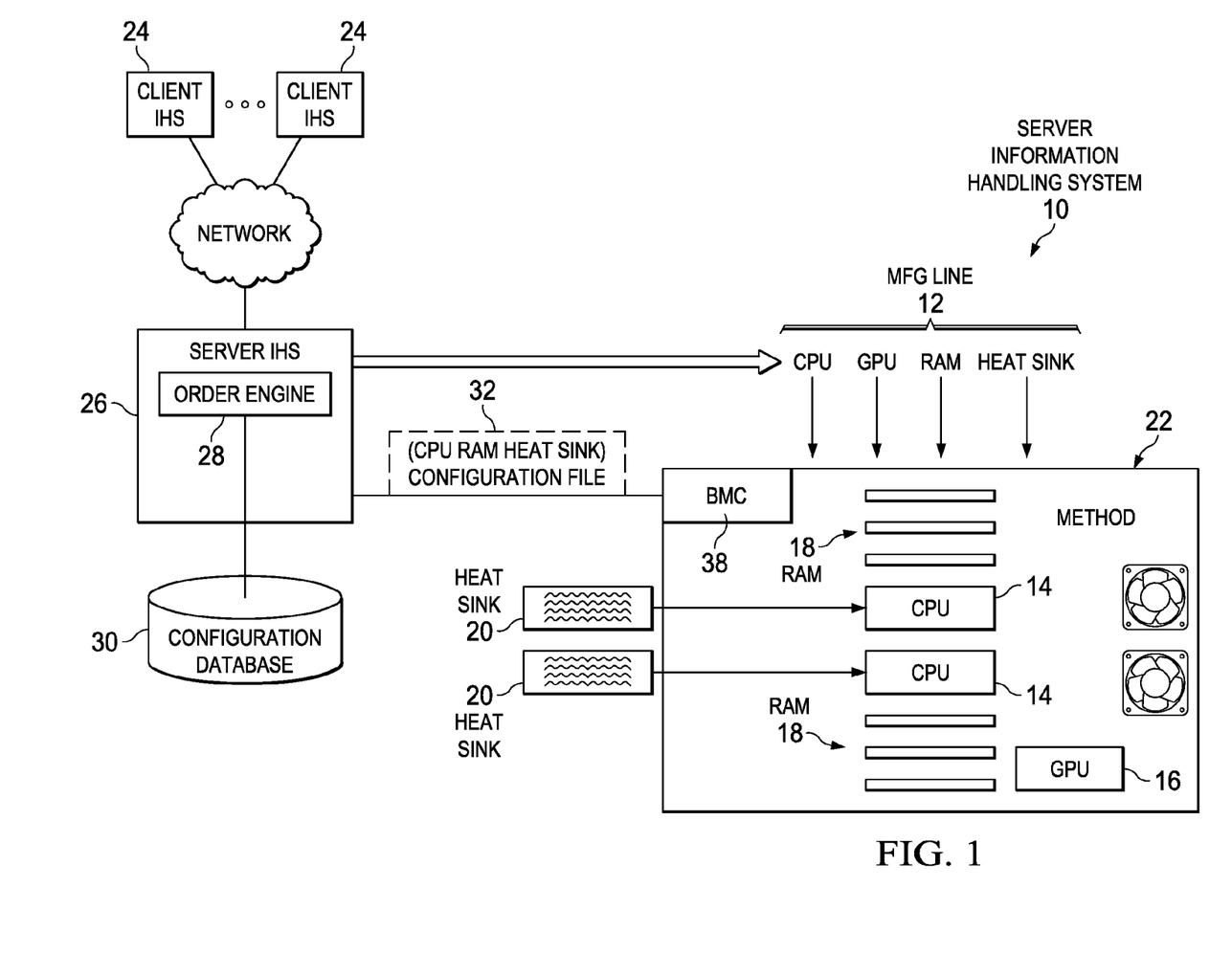
FIG. 1 depicts a block diagram of a system for managing heat sink compatibility at an information handling system.

Referring now to FIG. 1, a block diagram depicts a system for managing heat sink compatibility at an information handling system 10. In the example embodiment, heat sink compatibility management starts with manufactures of a server information handling system 10 at a manufacture line 12, in which central processing units (CPU's) 14, graphics processing units (GPU's) 16, random access memory (RAM) 18 and heat sinks 20 are assembled on a motherboard 22. End users place orders for server information handling systems 10 by interacting through client information handling systems 24 with a server information handling system 26 that accepts orders at an order engine 28. Order engine 28 references a configuration database 30 in order to select compatible components for a server information handling system order and forwards a configuration file 32 with compatible CPU, RAM and heat sink selections to manufacture line 12.

Figure 2:
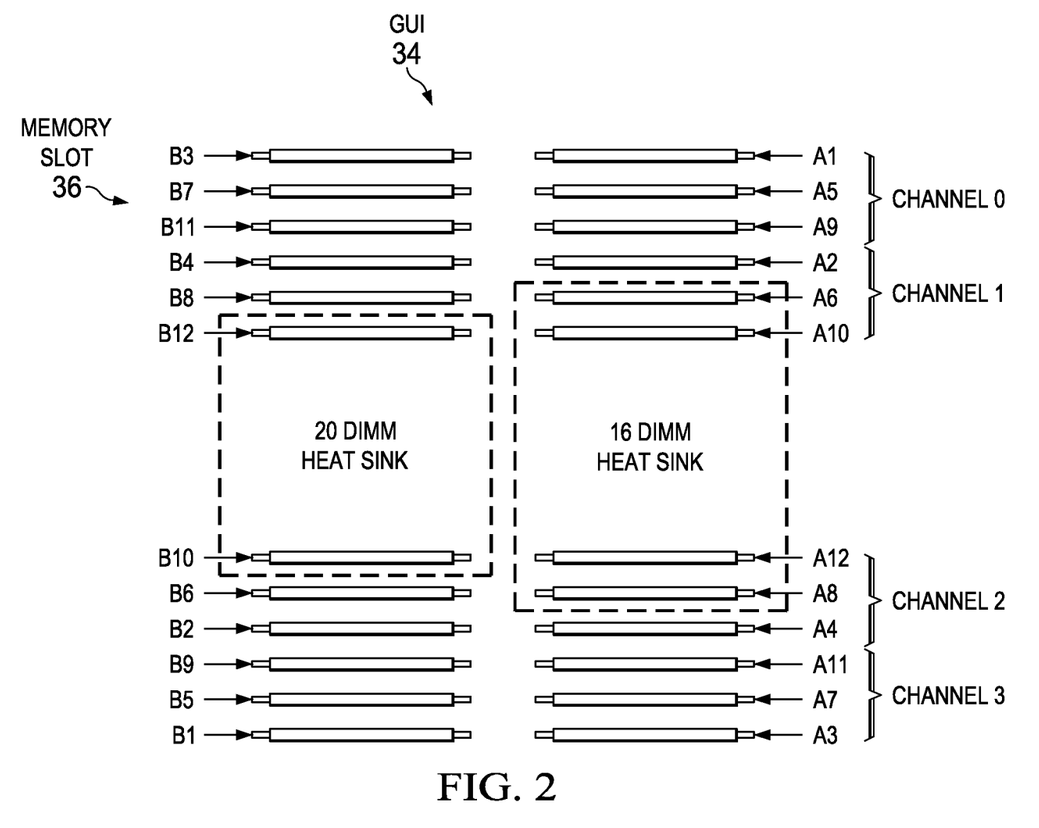
FIG. 2 depicts an example of a graphical user interface that presents CPU, RAM and heat sink configurations for a server information handling system.

During configuration of server information handling systems 10, heat sink size is based upon the selection of CPU 14, and specifically, on the thermal characteristics of CPU 14. FIG. 2 depicts an example of a graphical user interface 34 that presents CPU, RAM and heat sink configurations for a server information handling system 10. When a low-power CPU 14, such as 85 W or less, is installed, the heat sink 20 does not extend over any memory slots 36 so that a total of 24 DIMMs of RAM 18 may be inserted into memory slots 36 of motherboard 22. If a higher-power CPU 14, such 85-120 W, is installed, the greater amount of heat generated by operation at higher power consumption levels means that a larger heat sink 20 is needed in order for CPU 14 to operate at full power. As is depicted on user interface 34, the larger heat sink 20 cover one memory slot 36 in the channel 1 and 2 memory slots 36. An end user who selects the higher-power CPUs 14 will thus have to accept a configuration with less than all memory slots 36 populated by DIMMs. If the highest powered CPUs 14, such as greater than 125 W, is selected, then the thermal energy generated by the greater power consumption calls for a heat sink 20 that covers 2 memory slots in the channel 1 and 2 memory slots 36. Thus, in summary, a low power CPU 14 allows 24 DIMMS of memory, a high-power CPU 14 allows 20 DIMMS of memory, and the highest power CPU 14 allows 16 DIMMS of memory.

Incorrect configuration of server information handling system 10, either at manufacture or after delivery to an end user, can result in suboptimal performance. For example, the use of the highest power CPU 14 and the smallest heat sink 20 with a full load of 24 DIMMs will result in thermal throttling before the CPU's full performance capabilities are used. In such a configuration, neither the CPU nor the memory will have their capabilities fully exploited. As another example, the use of a low power CPU 14 with the largest-sized heat sink 20 will result in an overly-cooled CPU even at maximum performance with empty DIMM slots that are covered by heat sink 20. In addition, other factors may alter the selection of heat sink size and shape, such as slots or cutouts in the heat sink to make room for a GPU 16. Order engine 28 tracks CPU, RAM, GPU, and heat sink selections to ensure that the configuration is compatible at manufacturing line 12, and stores the configuration file 32 in non-volatile memory of server information handling system 10. For example, part numbers are captured from order engine 28, including the heat sink 20 part number, and stored in non-volatile memory as a field of the per-system license. The part numbers are kept up-to-date during service or replacement operations with a utility that includes updates to heat sink 20 identifiers in the event the heat sinks are replaced. The per-system license field populates a table accessible by BIOS firmware, such as firmware running on baseboard management controller (BMC) 38, which provides thermal profiles to a thermal controller to manage thermal conditions within server information handling system 10. A difficulty that can arise with such thermal management is that an incorrect configuration may be built into server information handling system 10, leading to unstable thermal control. Although BMC 38 generally can obtain identifiers from active components, such as CPUs 14 and memory 18, in some instances passive components, such as heat sinks 20, do not communicate with BMC 38. The above example embodiment does not require communication from a heat sink to the system and thus provides configuration confirmation without additional hardware cost and design complexity.

Figure 3:
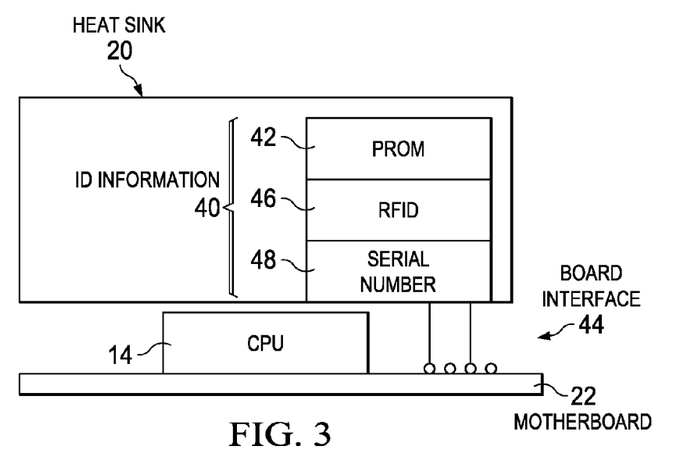
FIG. 3 depicts a side view of a heat sink mounted on a CPU with identifier information to confirm thermal configuration.

Referring now to FIG. 3, in alternative embodiments, a side view depicts a heat sink 20 mounted on a CPU 14 with identifier information 38 to confirm thermal configuration. In the example embodiment, identifier information 40 includes a PROM 42 that stores an identifier of heat sink 20 in non-volatile memory and communicates the identifier to motherboard 22 through a board interface 44. Board interface 44 is, for example, an I2C or other serial link that communicates the identifier to BMC 38 for confirmation that the installed heat sink matches the heat sink listed in the license configuration file 32. Other examples of identifier information 38 include an RFID device 46, which is read by an RFID reader integrated in server information handling system 10 or held by an end user, and an etched serial number 48 read by an optical code reader or manually by an end user. In one example embodiment, board interface 44 provides an identifier by creating an N-bit wide code based on the number and location of contacts between heat sink 20 and motherboard 22. For example, each contact pin extending into an opening of motherboard 22 grounds a set of resistors that are pulled up by the system board. BMC 38 includes logic that decodes the N-bit word to determine the identifier. In alternative embodiments, a camera image is analyzed to determine unique physical features, a CPU socket load plate or other element detects physical features, or other unique features are used to identify a heat sink 20 and compare the identified heat with the configuration file heat sink to detect any incompatibilities.

Figure 4:
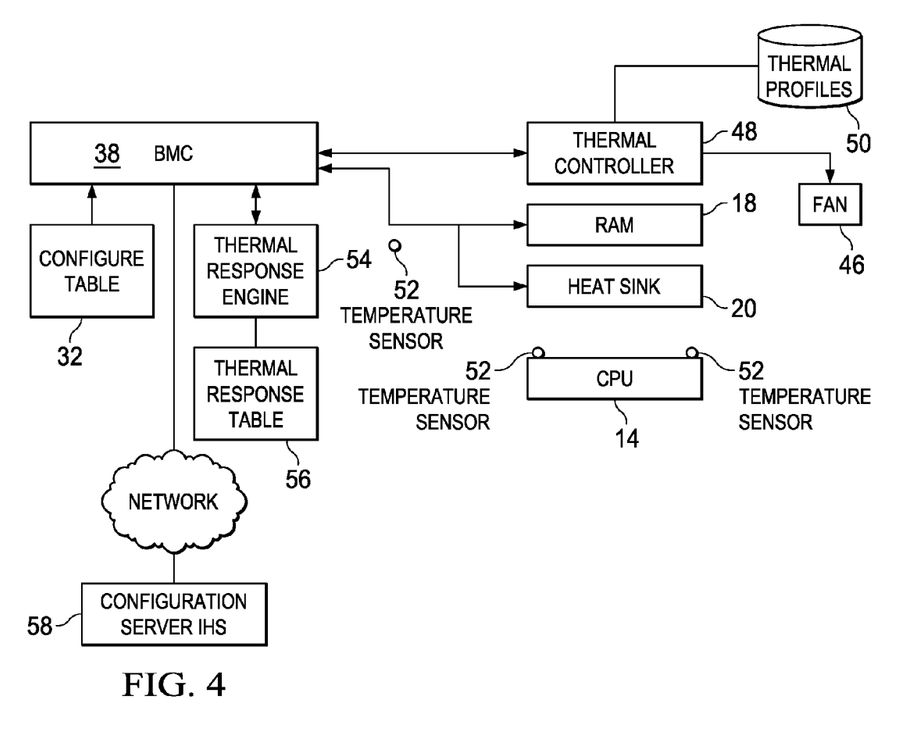
FIG. 4 depicts a block diagram of a system for thermal management of an information handling system with heat sink identification by workload characteristics thermal response.

Referring now to FIG. 4, a block diagram depicts a system for thermal management of an information handling system with heat sink identification by workload characteristics thermal response. Active management of thermal conditions in an information handling system housing is accomplished with a cooling fan 46, which provides a cooling airflow through the housing to remove excess thermal energy. A thermal controller 48 controls the operation of cooling fan 46 to increase or decrease the rate of fan rotation and thus the mass air flow of the cooling air flow based upon a thermal profile 50. Thermal profiles 50 are defined to maintain desired thermal constraints based upon the components disposed in the information handling system based upon configuration table 32, which includes a parts list from manufacture that is update based upon components detected by BMC 38. For example, thermal controller 48 retrieves configuration information from configuration table 32 that defines the CPU, RAM, GPU, heat sink, altitude and other environmental factors. Thermal controller 48 selects a thermal profile 50 from a plurality of stored thermal profiles based upon the configuration information and then applies the selected thermal profile 50 to set a cooling fan 46 speed based upon thermal conditions detected by temperature sensors 52. Temperature sensors 52 sense thermal conditions at known locations, such as intake ambient temperature, exhaust temperature, and temperature spread across a plurality of regions of various components, such as processor 14, RAM 18 and heat sink 20.

In order to ensure that a correct thermal profile 50 is used by thermal controller 48, a thermal response engine 54 tests the information handling system thermal response to a defined characterized workload and compares the tested thermal response with an expected thermal response for the configuration as defined in a thermal response table 56. Thermal response engine 54 uses detected configuration information to the extent such information is available, and tests thermal response for undefined components, such as heat sinks 20 that lack identification information. For example, thermal response table 56 is a pre-generated table stored in BIOS or BMC 38 that provides CPU thermal response as measured by CPU internal temperature sensors 52 for each supported heat sink variation versus a characterized workload, ambient inlet air temperature, local CPU temperature(s), fan speed, altitude or other environmental conditions. For example, the characterized workload is an instruction set run during power-on system test (POST) that raises CPU 14 temperature a different amount depending upon the size of heat sink 20 coupled to CPU 14. If CPU 14 temperature change matches an expected result for the heat sink 20 configured on the CPU 14, then the heat sink configuration is validated. If the CPU 14 temperature change does not match an expected temperature change, an alert issues to the end user that an incorrect heat sink may be installed. The CPU temperature increase will generally be greater than expected if the installed heat sink is too small, and the CPU temperature increase will generally be smaller than expected if the installed heat sink is too large. However, the expected temperature change may be manipulated across the surface of the CPU by running a set of instructions in a particular manner, such as at a particular core. Information handling systems having multiple CPUs 14 may have each CPU tested to verify the heat sink 20 coupled to each heat sink. In one embodiment, thermal response testing may be remotely managed from a configuration server information handling system 58 interfaced through a network.

In one embodiment, if thermal response engine 54 fails to find an adequate match of the configured heat sink with the detected heat sink, then thermal response engine 54 issues a warning to the end user and adjusts the thermal profile 50 used by thermal controller 48. If the detected heat sink thermal response matches or approximates the expected heat sink thermal response of another heat sink 20 having a thermal profile 50, then thermal response engine 54 may reconfigure thermal controller 48 to use the detected heat sink. If the detected heat sink thermal response is outside of the bounds of any expected thermal response, thermal response engine 54 may establish a thermal profile 50 for a system that lacks a heat sink. In one embodiment, thermal response engine 54 compares detected populated DIMM sockets with the detected heat sinks and issues an alert if an incompatibility is detected. Similarly, thermal response engine 54 may issue an alert if a GPU is detected and the detected heat sink is not compatible with a GPU installation. The DIMM and GPU configurations are determined via SMBus or other management bus reads from DIMM and GPU SPD EEPROMs. In alternative embodiments, other passive types of devices may be detected based upon a thermal response analysis, such as the use of fan shrouds, power supplies, passive board components, etc. . . .

Figure 5:
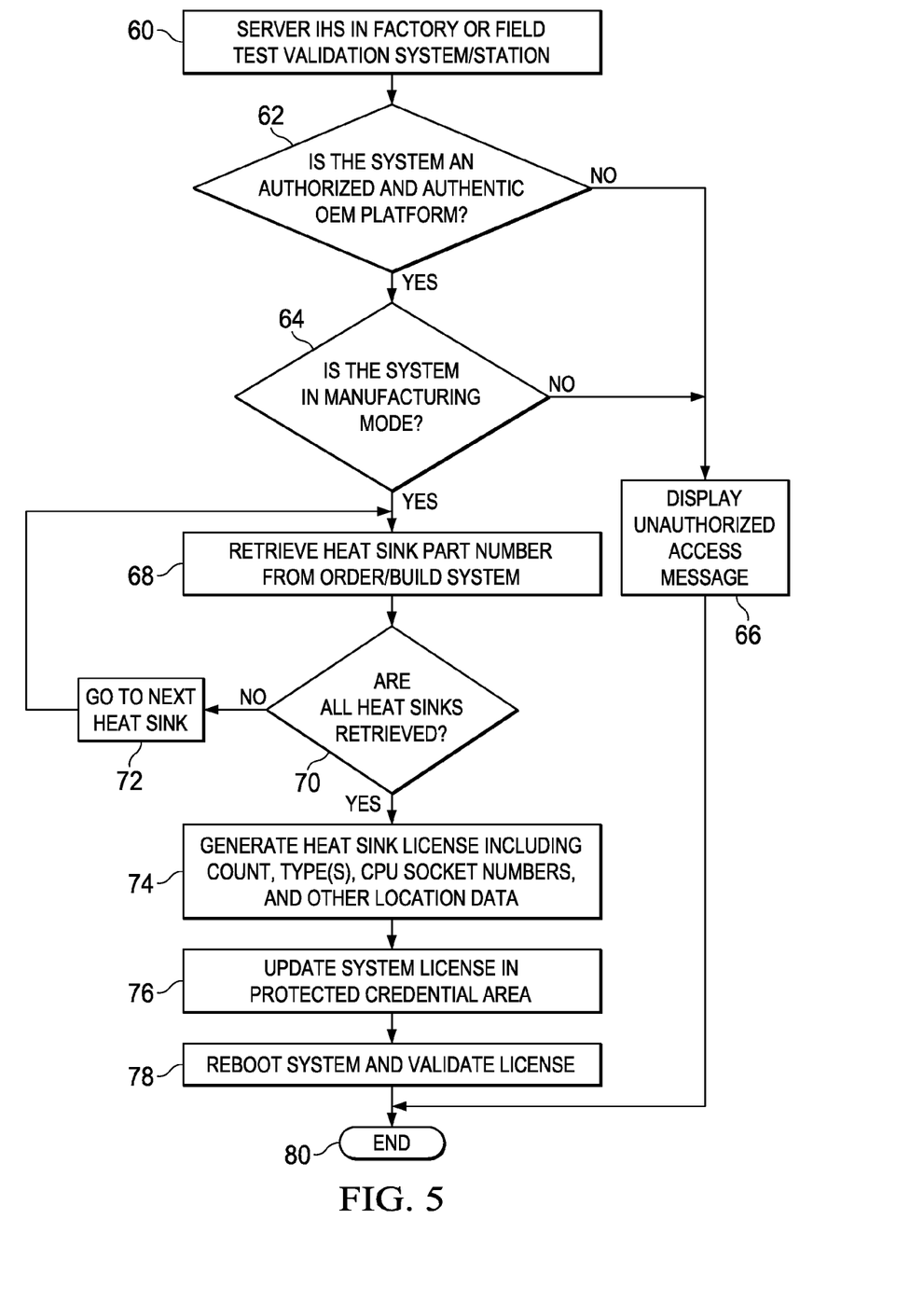
FIG. 5 depicts a flow diagram of a process for generating a passive component license entry for subsequent validation reference.

Referring now to FIG. 5, a flow diagram depicts a process for generating a passive component license entry for subsequent validation reference. The process starts at step 60 with the server information handling system in the factory or field test validation system or station. At step 62 a determination is made of whether the system is an authorized and authentic OEM platform entitled to license information. If yes, the process continues to step 64 to determine if the system is in manufacturing mode as required to accept a license update. If at steps 62 and 64 the system is not authorized for a license update, the process continues to step 66 to display an unauthorized user message and to step 80 to end. If at step 64 an authorized system is in manufacturing mode, the process continues to step 68 to retrieve the heat sink part number or other identifier from the system order or build system manifest. At step 70, a determination is made if all heat sink identifier are located and, if not, the process continues to step 72 to go to the next heat sink and return to step 68. If at step 70 all heat sink identifiers are retrieved, the process continues to step 74 to generate a heat sink license including the count, types, CPU socket numbers and other location data for each heat sink. At step 76 the system license is updated with the heat sink configuration information in the protected credentials area. At step 78, the system reboots and validates the license, and at step 80 the process ends with the heat sink configuration information stored for access by the BMC and/or BIOS.

Figure 6:
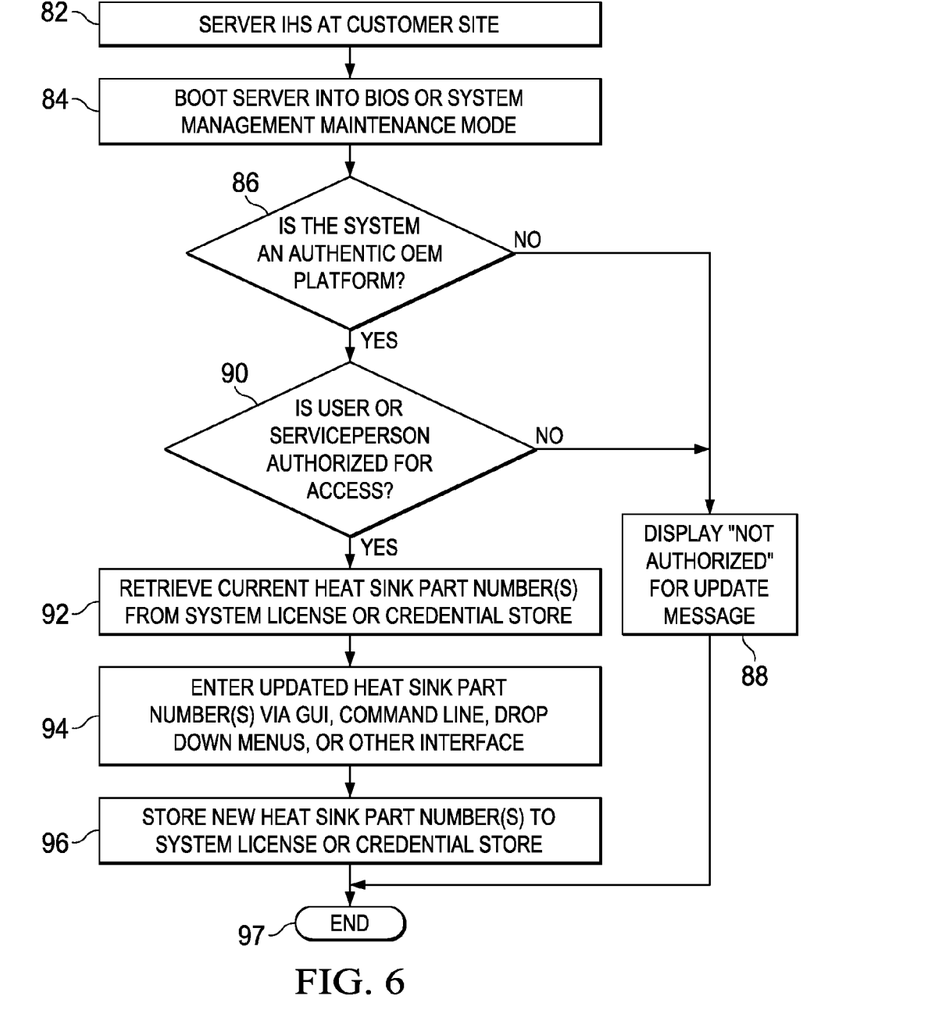
FIG. 6 depicts a flow diagram of a process for field service updates to a passive component license entry.

Referring now to FIG. 6, a flow diagram depicts a process for field service updates to a passive component license entry. The process starts at step 82 with the server information handling system at an end user location or other post-manufacturing location. The process continues to step 84 to boot the server information handling system into BIOS or other system management maintenance mode. At step 86, a determination is made of whether the system is an authentic OEM platform. If yes, the process continues to step 90 to determine if the current user is a service person authorized to access the license area. If either step 86 or 90 is no, the process continues to step 88 to display a "Not Authorized" message to the end user. If yes at step 90, the process continues to step 92 to retrieve the current heat sink part number from the system from the system license or credential store. At step 94, the user enters an updated heat sink part number into a license user interface, command line, drop down menu or other interface. At step 96, the new heat sink part number is stored in the system license or credential store.

Figure 7A:
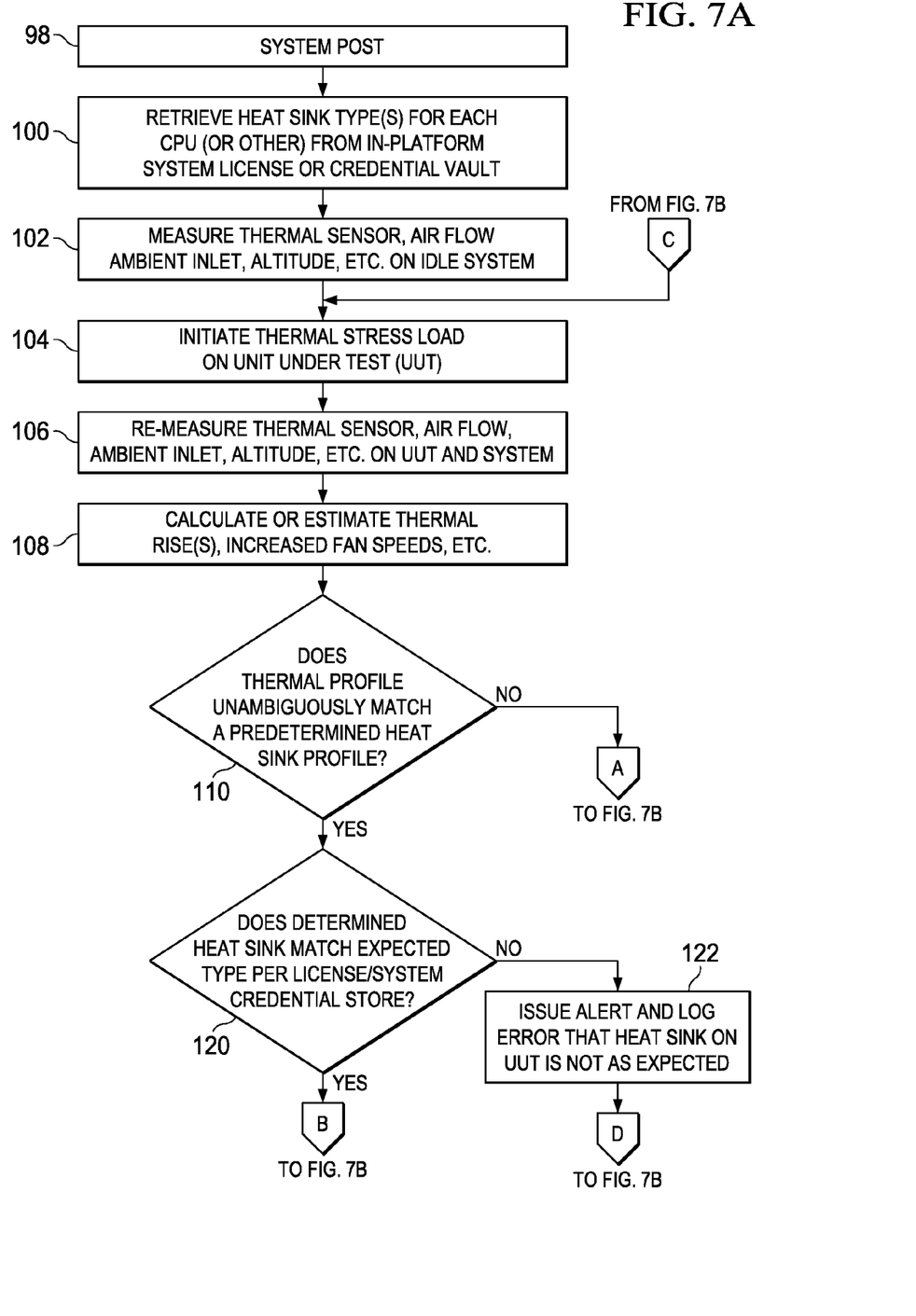
FIGS. 7A and 7B depict a flow diagram of a process for analyzing a passive component thermal response to a characterized workload.
Figure 7B:
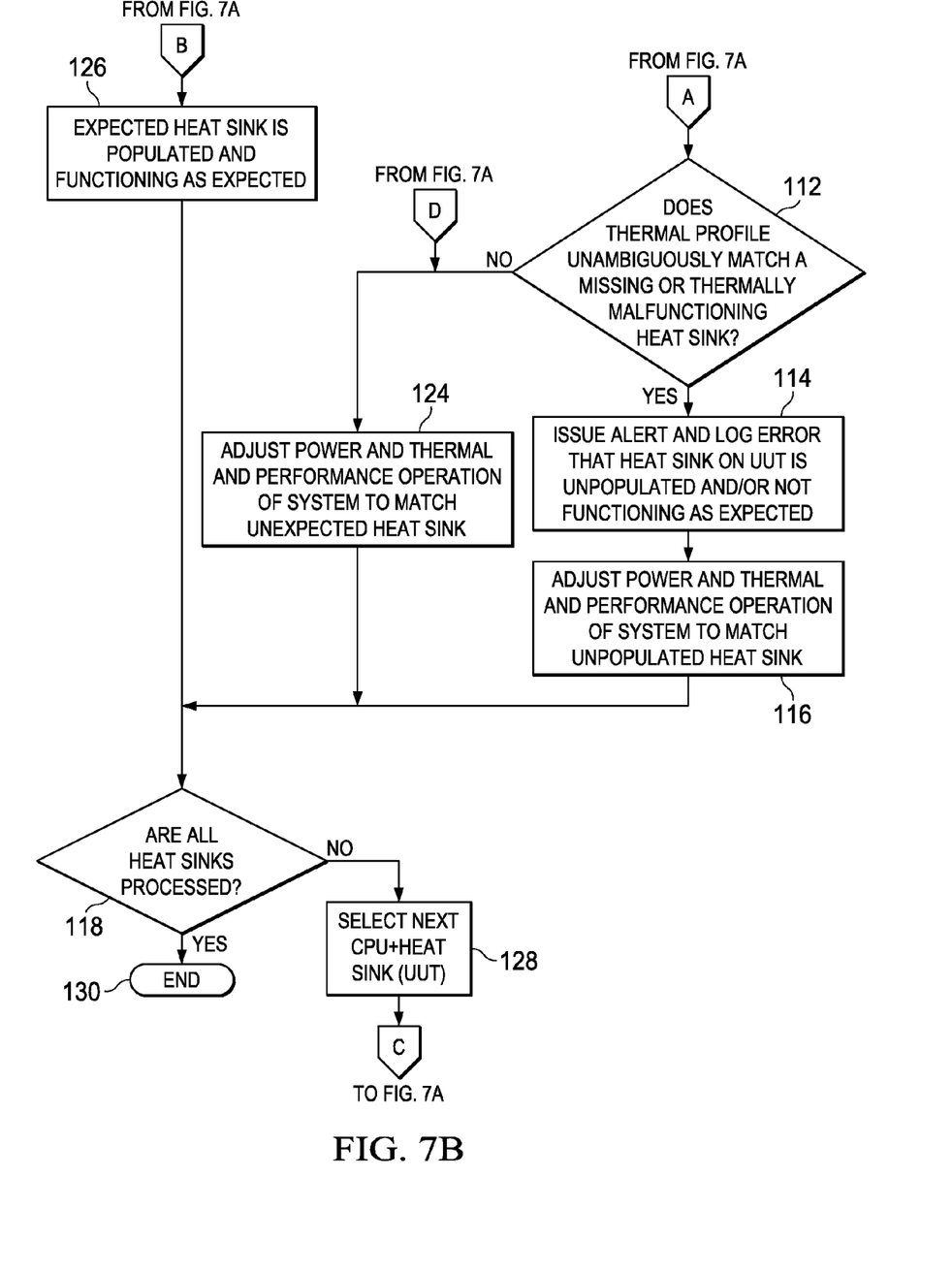

Referring now to FIGS. 7A and 7B, a flow diagram depicts a process for analyzing a passive component thermal response to a characterized workload. The process starts at step 98 upon entry into POST during system boot. In alternative embodiments, the process may analyze heat sink thermal response during other modes of operation, such as by entering a maintenance mode or approximating a response based upon CPU utilization. At step 100, the heat sink type is retrieved for each CPU from the platform system license or credentials vault. At step 102, the thermal sensor, airflow, ambient inlet, altitude and other factors are measured with the system in an idle state. At step 104, a thermal stress load is initiated at a CPU under test, such as by initiating a test workload instruction set for a predetermined time. At step 106, another measurement is taken of the factors measured at step 102 to determine the change in the thermal state. At step 108, a calculation or estimation is made of the thermal rise and operating state change, such as the temperatures at various locations of the CPU, the heat sink temperature, the exhaust temperature and the fan speed setting. At step 110, a determination is made of whether the detected thermal profile for the heat sink under the characterized workload matches a predetermined heat sink profile of the configured heat sink with a sufficient accuracy.

If at step 110 an adequate match is not found, the process continues to step 112 to determine if the thermal profile matches a known failure state, such as a missing or uncoupled heat sink, the process continues to step 114 to issue an alert and log an error that the heat sink on the CPU under test is not properly configured. The process then continues to step 116 to adjust power and thermal performance operations of the system to match an unpopulated heat sink. If at step 112 the thermal profile does not match a failed state, the process continues to step 124 to adjust the power and thermal settings to match the unexpected heat sink actually detected in the test. From step 116 and 124, the process continues to step 118 to determine if all CPU heat sinks were tested. If yes, the process ends at step 130. If no, the process continues to step 128 to select the next heat sink in order and then to step 104 to test the next heat sink in order.

If at step 110 the process determines that a match exists with an existing thermal profile of a heat sink, the process continues to step 120 to determine if the detected heat sink matches the heat sink listed in the license credentials as loaded on the information handling system. If not, the process continues to step 122 to issue an alert and log an error that the heat sink on the unit under test is not as expected. At step 124, the process adjusts the power and thermal settings to match the detected heat sink, and then the process continues on to step 118 as described above. If at step 120 the detected heat sink thermal response matches the heat sink stored in the license area, the process continues to step 126 to conclude that the correct heat sink is loaded and to step 118 to determine if another CPU needs to be tested. Once all CPU heat sinks are tested for thermal response the process ends at step 130.

Although the present invention has been described in detail, it should be understood that various changes, substitutions and alterations can be made hereto without departing from the spirit and scope of the invention as defined by the appended claims.

What is claimed is:

1. An information handling system comprising:
   a motherboard;
   a processor coupled to the motherboard and operable to execute instructions;
   memory interfaced with the processor and operable to store information;
   a heat sink coupled to the processor;
   a temperature sensor operable to sense a temperature;
   a thermal response engine interfaced with the temperature sensor and operable to compare sensed temperatures against expected temperatures for a processor workload to identify the heat sink;
   an identifier coupled to the heat sink; and
   a heat sink identification reader interfaced with the thermal response engine and operable to read the identifier of the heat sink, the thermal response engine applying the identifier to determine the expected temperatures;
   wherein the processor workload comprises a predetermined instruction set run during boot of the information handling system.

2. The system of claim 1 further comprising:
   a thermal response table relating a plurality of heats sink identifiers with expected temperatures for processor workloads; and
   a user interface operable to present an identified heat sink to an end user in response to a predetermined condition.

3. The system of claim 2 wherein the predetermined condition comprises a heat sink identified by the thermal response engine that fails to match a heat sink identifier stored as configuration information in non-volatile memory.

4. The system of claim 2 wherein the thermal response engine comprises firmware instructions executing on a baseboard management controller.

5. The system of claim 2 wherein the sensed temperatures comprise temperatures sensed within the processor.

6. The system of claim 2 wherein the predetermined condition comprises a heat sink identifier associated with restricted memory placement and a processor identifier having a predetermined thermal profile.

7. The system of claim 1 wherein the processor workload comprises a predetermined instruction set executed during POST.

8. A method for managing information handling system thermal conditions, the method comprising:
   storing a heat sink identifier in non-volatile memory of the information handling system;
   reading the heat sink identifier from a heat sink with a heat sink identification reader integrated in the information handling system;
   executing a characterized workload on the information handling system;
   comparing one or more temperatures sensed in the information handling system in response to the characterized workload with one or more temperatures expected in the information handling system to validate the identity of the heat sink installed in the information handling system as the heat sink associated with the heat sink identifier if the sensed temperatures are within a predetermined margin of the expected temperatures; failing to validate the identity of the heat sink;
   in response to failing to validate, characterizing a heat sink thermal response based upon the temperatures sensed in the information handling system; and
   adjusting a thermal controller to manage active thermal control of the information handling system according to the characterized heat sink thermal response.

9. The method of claim 8 wherein characterizing a heat sink thermal response further comprises:
   comparing the temperatures sensed in the information handling system with temperatures expected for one or more heat sinks other than the heat sink associated with the stored identifier; and
   assigning a heat sink thermal response of the one or more heat sinks that have expected temperatures approximate to the sensed temperatures.

10. The method of claim 9 wherein the executing a characterized workload further comprises:
    executing a predetermined instruction set on a processor coupled to the heat sink during boot of the information handling system; and
    sensing one or more temperatures of the processor after a predetermined time of the executing.

11. The method of claim 10 wherein the information handling system comprises a plurality of processors, the executing a characterized workload further comprising:
    executing the predetermined instruction set on each processor coupled to a heat sink during boot of the information handling system; and
    sensing the one or more temperatures of each processor after a predetermined time of the executing.

12. The method of claim 10 further comprising:
    determining the processor identity and memory configuration of the information handling system; and
    comparing the heat sink identifier, the characterized heat sink thermal response, the processor identity and the memory configuration to detect an incompatibility; and
    in response to the incompatibility, issuing an alert.

13. A system for managing thermal conditions of an information handling system, the system comprising:
    non-transitory memory;
    a thermal controller stored in the non-transitory memory and operable to control an active thermal management device according to a thermal profile, the thermal profile based at least in part on an identifier of a heat sink disposed on a processor in the information handling system;
    a heat sink identifier interfaced with the thermal controller and operable to read the identifier from the heat sink; and
    a thermal response engine stored in the non-transitory memory and operable to compare a thermal response of the processor to a predetermined workload with an expected thermal response to the predetermined workload in order to validate that the heat sink disposed on the processor has a thermal characteristic associated with the identifier read from the heat sink;
    wherein the predetermined workload comprises an instruction set run during boot of the information handling system.

14. The system claim 13 wherein the thermal response engine is further operable to:
    determine that the heat sink has a thermal characteristic associated with a different identifier; and in response to determining the different identifier, coordinating use by the thermal controller of a thermal profile associated with the different identifier.

15. The system of claim 14 wherein the thermal response engine is further operable to analyze a memory configuration of the information handling system, a processor identifier of the processor and the heat sink characteristic to determine an incompatibility and to issue an alert regarding the incompatibility.

16. The system of claim 15 wherein the incompatibility comprises a heat sink footprint that extends over memory slots and a processor having less than a predetermined thermal characteristic.

\* \* \* \* \*